US010347970B2

(12) United States Patent
Niakan

(10) Patent No.: US 10,347,970 B2
(45) Date of Patent: Jul. 9, 2019

(54) INSTRUMENT WITH CONDUCTIVE HOUSING

(71) Applicant: Microsoft Technology Licensing, LLC, Redmond, WA (US)

(72) Inventor: Nahal Niakan, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 15/494,411

(22) Filed: Apr. 21, 2017

(65) Prior Publication Data

US 2018/0309190 A1    Oct. 25, 2018

(51) Int. Cl.
*H01Q 1/22* (2006.01)
*H01Q 1/24* (2006.01)
*H01Q 1/44* (2006.01)
*H01Q 1/48* (2006.01)
*H01Q 5/20* (2015.01)
*H01Q 9/22* (2006.01)
*G06F 3/0354* (2013.01)

(52) U.S. Cl.
CPC ......... *H01Q 1/243* (2013.01); *G06F 3/03545* (2013.01); *H01Q 1/22* (2013.01); *H01Q 1/44* (2013.01); *H01Q 1/48* (2013.01); *H01Q 5/20* (2015.01); *H01Q 9/22* (2013.01)

(58) Field of Classification Search
CPC ............ H01Q 1/243; H01Q 5/20; H01Q 1/48; H01Q 9/22; H01Q 1/44; H01Q 1/22; G06F 3/03545; G06F 3/033
USPC .......................................... 343/702; 345/179
See application file for complete search history.

(56) References Cited

U.S. PATENT DOCUMENTS

| 7,289,080 | B1 | 10/2007 | Bohlman |
| 8,872,792 | B2 | 10/2014 | Bakken et al. |
| 9,129,180 | B2 * | 9/2015 | Lazaridis ................. B43K 7/02 |
| 9,213,424 | B1 | 12/2015 | Dunn |
| 9,229,598 | B2 | 1/2016 | Liu et al. |
| 9,312,600 | B2 * | 4/2016 | Wang ....................... H01Q 1/52 |
| 9,367,149 | B2 * | 6/2016 | Dowd ................. G06F 3/03545 |
| 2006/0158440 | A1 | 7/2006 | Ashenbrenner |
| 2012/0105362 | A1 | 5/2012 | Kremin et al. |
| 2013/0207925 | A1 | 8/2013 | Ryshtun et al. |
| 2013/0249870 | A1 | 9/2013 | Slaby et al. |

(Continued)

FOREIGN PATENT DOCUMENTS

EP    2698260 A1    2/2014

OTHER PUBLICATIONS

Ramos, et al., "Pointing Lenses: Facilitating Stylus Input through Visual- and Motor-Space Magnification", In Proceedings of the SIGCHI Conference on Human Factors in Computing Systems, Apr. 28, 2007, pp. 757-766.

(Continued)

*Primary Examiner* — Khai M Nguyen
(74) *Attorney, Agent, or Firm* — NovoTechIP International PLLC

(57) ABSTRACT

An instrument includes a housing that defines a handle for a user of the instrument, and a circuit disposed within the housing, the circuit being configured to implement wireless communications. The housing includes a conductive shaft. The circuit is electrically connected to the conductive shaft such that the conductive shaft is configured as an antenna element for the wireless communications or as a ground plane for the antenna element.

17 Claims, 3 Drawing Sheets

(56) References Cited

U.S. PATENT DOCUMENTS

| | | |
|---|---|---|
| 2014/0134962 A1 | 5/2014 | Huynh et al. |
| 2014/0159975 A1 | 6/2014 | Apostolos et al. |
| 2014/0162734 A1 | 6/2014 | Shewan et al. |
| 2014/0176495 A1 | 6/2014 | Vlasov |
| 2014/0253468 A1 | 9/2014 | Havilio et al. |
| 2015/0255859 A1 | 9/2015 | Harper |
| 2016/0179222 A1 | 6/2016 | Chang |
| 2016/0179223 A1 | 6/2016 | Konanur et al. |
| 2017/0010697 A1* | 1/2017 | Jiang .................. G06F 3/03545 |

OTHER PUBLICATIONS

"International Search Report and Written Opinion Issued in PCT Application No. PCT/US18/026376", dated Jun. 26, 2018, 17 Pages.

* cited by examiner

INSTRUMENT WITH CONDUCTIVE HOUSING

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
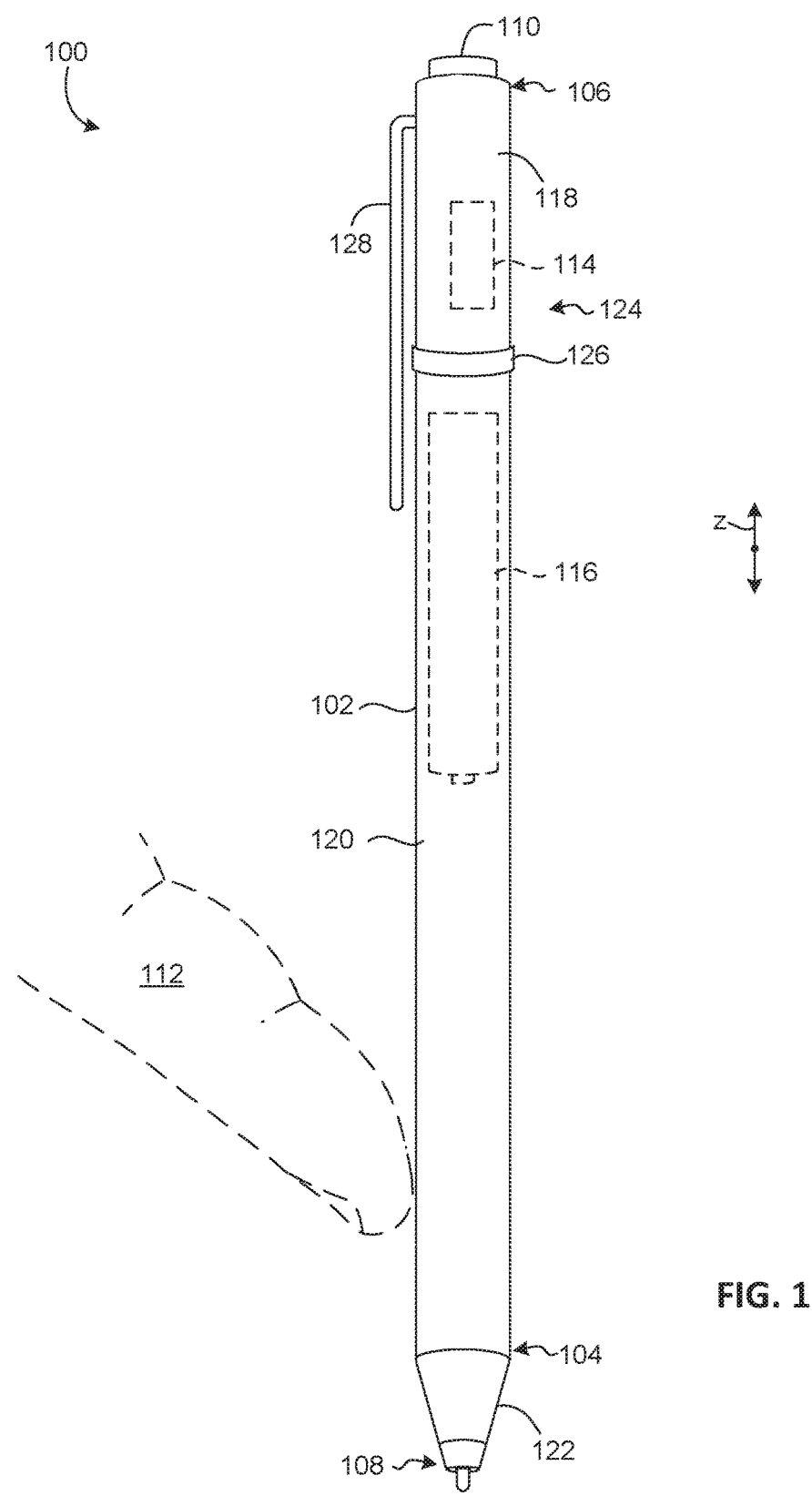
FIG. 1 is an elevational view of a pen instrument configured for wireless communications with antenna functionality provided via conductive housing in accordance with one example.

The embodiments of the disclosed devices may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION

Active pens have an antenna to communicate with other devices. The antenna is positioned, sized, and otherwise configured to support the reception and/or transmission of radio frequency (RF) signals. The RF signals fall within one or more frequency bands for communications in accordance with a communication protocol, such as the Bluetooth protocol. The size and other characteristics of the antenna are selected such that an antenna element of the antenna radiates signals within the frequency bands.

Pens and other instruments having a conductive housing or body to provide one or more antennas are described. Some or all of the housing or body may be conductive. The housing or body includes one or more conductive shafts. Each conductive shaft is configured as a component of an antenna, such as an antenna element for the wireless communications or as a ground plane for the antenna element. The conductive shafts may be metal sections, rings, bands, or other structures. The conductive structures may be electrically separated from one another by non-conductive rings or bands that also form a portion of the device housing or body.

The housing-based antenna components are capable of supporting communications in accordance with one or more wireless communication protocols. The disclosed pens may include multiple antenna elements to support multiple frequency bands relied upon by the protocols. Various frequency bands may be supported, including, for instance, the Bluetooth, global positioning satellite (GPS), long term evolution (LTE), industrial, scientific, medical (ISM), and IEEE 802.11 (W-Fi) frequency bands.

The housing-based antenna increases the internal space for circuitry and other pen components not related to wireless communications. The pen may include a large number of components and subsystems disposed within the pen housing. For instance, space within the housing that would otherwise be consumed by an antenna (e.g., a trace on a printed circuit board) may be dedicated to other components, such as a battery. Battery life and other device functionality is accordingly improved.

Using the housing, or body, of the pen as an antenna component also allows the pen to implement wireless communications in a compact manner. Antenna size depends on frequency of operation. The lower frequency bands involve longer wavelength RF signals and, thus, larger antenna elements. The space savings may be useful in connection with wireless communication protocols involving lower frequency bands, such as the global positioning satellite (GPS) and long-term evolution (LTE) protocols. The disclosed pens may be realized in a compact manner despite supporting wireless communications in accordance with such protocols.

The antenna components are realized without detrimental effects on the look and feel of the pens. The pens may have metal bodies (e.g., handles). Use of metallic and other conductive materials provides a smooth and seamless feel for the pen, including those portions of the housing that function as a handle. The disclosed pens may include more metal components than typically found in active pens, insofar as metal components would otherwise undesirably shield internal antennas. Non-metal and metal components may be included for cosmetic purposes. The disclosed pens may have an exterior surface that feels and looks like those of non-active pens. The overall weight, diameter, length, and shape of the disclosed pens may not deviate from a desired form factor.

Relying on the housing or body of the pen also does not inhibit other functionality involving the outer surface of the pen. For instance, the disclosed pens may include rings, bands, end caps, and other structures for other functions, whether the structures are conductive or non-conductive. In some cases, other conductive structures are integrated into the antenna functionality. For instance, a conductive end cap may be electrically connected to a portion of the pen housing to collectively establish an antenna element. Conductive and non-conductive rings or bands may be used (e.g., swapped) to re-configure the pen for different frequency bands.

The housing-based antenna functionality may expand the utility of active pens and styluses. For instance, the wireless communications supported by the antenna functionality may be used to allow a single pen or stylus to be used with multiple host devices. A single instrument may thus be compatible with a user's devices at home, work, school, and other locations or environments.

Although described in connection with active pens or styluses, the housing-based antenna functionality of the disclosed instruments is not limited to pens or styluses. Other types of handheld instruments may include the housing-based antenna functionality described herein.

The disclosed instruments are also not limited to instruments configured to interact with touch-sensitive displays or other touch-enabled devices. For instance, the disclosed instruments may or may not be capable of interacting with a tablet, phone, or other touch-sensitive display. The disclosed instruments are not limited to such devices, but instead useful with a wide variety of devices. For instance, the disclosed instruments may communicate with various types of remote servers and other computing devices. In some cases, the wireless communications may be useful for transmitting data to a remote storage device. The disclosed pens may thus be considered and configured to act as a client computing device or sensor rather than simply a writing or input accessory or instrument.

The disclosed instruments may include internal antenna elements and other antenna-related components. For instance, the disclosed instruments may include an antenna (or antenna element) printed or otherwise disposed on a printed circuit board. Such antennas may be configured as a driven element of an antenna that, in turn, excites a passive, or parasitic, antenna element provided via the housing as described herein. Alternatively or additionally, the disclosed pens may include internal antenna elements that do not use a conductive component of the housing for antenna functionality. The housing may include one or more non-conductive sections or portions that provide a window for such internal antenna elements.

Despite the use of metal housing components, the disclosed instruments may nonetheless include housing components composed of plastic and other non-conductive materials. But such use of non-conductive materials is optional, rather than required. That is, various aspects of the disclosed pens avoid forcing the housing and other external components of the pens to be non-conductive to support antenna functionality. Antenna functionality thus does not become a design impairment.

The housing-based antenna components and aspects of the disclosed instruments may be useful in a wide variety of contexts and scenarios. For instance, the wireless communications may be used to find or locate a lost or misplaced pen or instrument, or otherwise track the location of the instrument. The wireless communications may alternatively or additionally transmit data collected by the instrument (e.g., from one or more sensors of the instrument). For example, the instruments may include sensors configured to gather biometric data regarding the user holding the instrument, including, for instance, temperature, moisture (e.g., sweat), optical (e.g., heart rate) sensors. The housing-based antenna aspects are thus not limited to pens. For instance, other types of instruments (e.g., sensor or other data capture instruments) may be configured with housing-based antenna functionality as described herein. Still other types of devices may have housing-based antenna components, including, for instance, internet-of-thing (IOT) devices. For example, various handheld devices, such as a cane or walker, may include the housing-based antenna components for transferring data regarding the health status or condition of a user holding the instrument. In these and other cases, the transferred data may be indicative, for instance, the extent to which the user is shaking. The disclosed devices may include one or more accelerometers, gyroscopes, or other motion sensors directed to capturing data indicative of the shaking or other health status or conditions of the user.

FIG. 1 depicts an instrument 100 having a housing 102 that provides antenna functionality in accordance with one example. In this case, the instrument 100 is a pen or pen-shaped device, such as a stylus. The instrument 100 may be an active pen in the sense that the instrument 100 has functionality beyond use as a writing instrument. For example, the instrument 100 may be configured for use with a host device, such as a tablet, laptop, or other computing device. The instrument 100 may be configured to interact with a touch-sensitive display or other surface (e.g., a touchscreen) of the host device or another device in communication therewith (e.g., a touch pad). The interaction with the host device may or may not include communications (e.g., Bluetooth communications) via the antenna functionality. The instrument 100 may thus communicate with devices other than the host device, such as a server computing device.

The housing 102 includes two ends 104, 106. In this example, the housing 102 has an elongate shape, extending between the ends 104, 106 in an axial direction Z. The instrument 100 may include a tip 108 at the end 104 and a cap 110 at the end 106. In this case, the housing 102 extends axially from the tip 108 to reach the cap 110.

The tip 108 and/or the cap 110 may be electrically active (e.g., a stylus tip) or passive (e.g., a pen tip). For example, the tip 108 may be configured to dispense ink and/or include other passive components, such as a conductive tip. The tip 108 may alternatively or additionally include active components, including, for instance, conductive or other elements directed to interacting with a host device. For example, the tip 108 may be or include a sensor (i.e., a tip sensor) that, in some cases, is configured to interact with a host device. Other active components may be included. For instance, the tip 108 may be configured for a variety of other functions, including, projecting light (e.g., a laser or other pointer). The tip 108 may or may not be tapered or otherwise pointed for, e.g., low contact area. For instance, one or both of the tip 108 and the cap 110 may be or include a soft (e.g., rubber) tip. The cap 110 may be an eraser and/or passive end cap. Alternatively, the cap 110 may be or include a button or toggle switch to activate the instrument 100 and/or one or more operations thereof. Other types of active end caps may be used, including, for instance, caps having a microphone or camera.

The housing 102 defines an outer surface of the instrument 100 between the two ends 104, 106. The housing 102 thus defines a handle for a user 112 the instrument 100. The user 112 may grasp or otherwise contact the housing 102 at a point closer to the end 104, as shown in FIG. 1. The manner in which the user 112 holds the instrument 100 may vary from example shown. For example, the user 112 may hold the instrument differently in accordance with the manner in which the instrument 100 is used.

The housing 102 also defines an inner volume or space within which components of the instrument 100 are enclosed or otherwise disposed. The inner volume may or may not be defined by the portion(s) of the housing 102 that defines an outer surface of the instrument 100. For instance, the housing 102 may include one or more layers, films, coatings, or other structures stacked or layered upon one another. The housing 102 may thus include one or more inner layers or other structures disposed in a nested arrangement relative to one or more outer layers or other structures of the housing 102. As a result, each of such inner and outer layers of the housing 102 may define respective inner volumes or spaces for the instrument 100 within which other components are disposed.

The instrument 100 includes a circuit 114 enclosed by, or otherwise disposed within, the housing 102. The circuit 114 is configured to implement the wireless communications. In some cases, the circuit 114 includes a printed circuit board (PCB) on which a number of components are mounted or otherwise disposed. For example, the circuit 114 may include a number of integrated circuit (IC) chips, including, for instance, a transceiver IC chip, soldered to the PCB. The circuit 114 may be configured to implement other functions, such as data collection and processing. For example, the circuit 114 may be configured to track and/or compute a position of the tip 108. The housing 102 may enclose a number of other components of the instrument 100. In the example of FIG. 1, a battery 116 of the instrument 100 is also enclosed by the housing 102.

The housing 102 includes a number of shafts or tubes 118, 120. One or both of the shafts 118, 120 is elongate in the axial direction Z. In the example of FIG. 1, the shaft 120 extends from the tip 108, and the shaft 118 extends from the cap 110. The shaft 118 is disposed adjacent (e.g., in contact with) the tip 108. The shaft 120 is adjacent (e.g., in contact with) the cap 110. In this case, each shaft 118, 120 is positioned as, and establishes a part of, an outer or external surface of the instrument 100. In other cases, one or more shafts of the housing 102 does not form a part of the outer surface. In the example of FIG. 1, the shaft 120 is positioned between the shaft 118 and the tip 108 to provide or define the handle for the user 112.

Each shaft 118, 120 may be cylindrical. Other shapes may be used. For example, one or more of the shafts 118, 120 may have a non-circular cross-section, such as a hexagonal cross-section.

In the example of FIG. 1, the housing 102 further includes a tapered or cone-shaped guide 122 for the tip 108. The guide 122 is disposed between the tip 108 and the shaft 118. In some cases, the guide 122 includes or encloses one or more sensors, such as motion sensors or biometric sensors. Such sensors may be disposed at other locations within the housing 102. The housing 102 may include other components disposed at various locations (e.g., along the axial length of the instrument 100).

One or more of the shafts 118, 120 is conductive to support the wireless communications. In the example of FIG. 1, both of the shafts 118, 120 are conductive. In other cases, one or more of the shafts 118, 120 (or other components of the housing 102) are non-conductive. The conductivity of the shaft(s) 118, 120 allows the housing 102 to provide, or act as, a component of an antenna 124 for the wireless communications. For instance, one or more of the shafts 118, 120 may be constructed, connected, and otherwise configured to act or operate as an antenna element. Alternatively or additionally, one or more of the shafts 118, 120 may be constructed, connected, and otherwise configured to act or operate as a ground plane for the antenna element. In the example of FIG. 1, the shaft 118 is configured as an antenna element of the antenna 124, and the shaft 120 is configured as a ground plane of the antenna 124. The shafts 118, 120 are electrically connected to the circuit 114 such that the shaft 118 acts as an antenna element and such that the shaft 120 acts as a ground plane. In some cases, the electrical connection is radiative (e.g., involving an electric field). The antenna element may accordingly be configured as a parasitic antenna element. Further details regarding the electrical connections and other aspects of these components of the antenna 124 are described below.

The shafts 118, 120 may be composed of, or include, one or metals or metallic materials. In some cases, the shafts 118, 120 are composed of Aluminum, Magnesium, and other metals. Other conductive materials may be used, including, various non-metallic conductive materials. In some cases, one or both of the shafts 118, 120 include a metal-coated, plastic structure.

The housing 102 may include non-conductive portions or components. In the example of FIG. 1, the housing 102 includes a non-conductive ring or other band 126 disposed between the shafts 118, 120. The ring 126 may act as an insulator to electrically isolate or separate the shafts 118, 120 from one another. For example, the ring 126 may be composed of, or otherwise include, a dielectric material. The ring 126 may define or otherwise provide a gap or spacing between the shafts 118, 120. In this case, the shafts 118, 120 are in contact with opposite sides of the ring 126. The shafts 118, 120 may be spaced apart from one another by alternative or additional components. The gap between the shafts 118, 120 may be sized to support the antenna functionality. The antenna functionality may establish a minimum size for the gap. In some cases, the minimum size is about 1 mm (e.g., 1.1 mm). A variety of dielectric materials or media may be used for the ring 126, including, for instance, air.

The instrument 100 also includes a clip 128. The clip 128 extends outward from, and axially along, the housing 102. In this case, the clip 128 extends outward from the shaft 118. The clip 128 may be non-conductive to avoid any adverse effects on the antenna functionality. In other examples, a clip is not included or otherwise attached to the housing 102.

One or both of the shafts 118, 120 may include non-conductive portions. For example, the shaft 120 may include a dielectric or insulator layer on which the conductive portion is disposed, as, for instance, a conductive coating. The conductive and non-conductive portions may or may not be coextensive.

Figure 2:
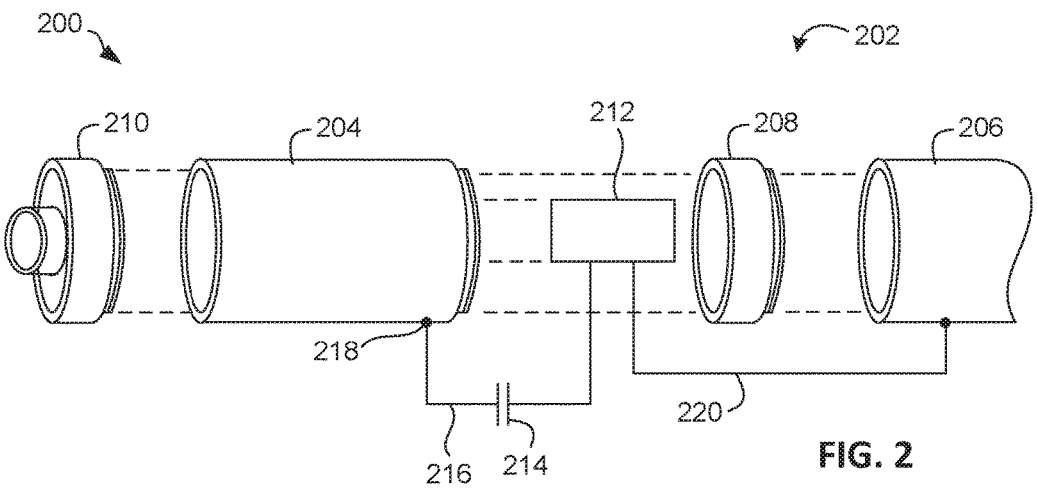
FIG. 2 is a partial, exploded, perspective, and schematic view of an antenna of the pen instrument of FIG. 1 in accordance with one example.

FIG. 2 depicts an instrument 200 with a housing 202 configured to act as an antenna in accordance with one example. The instrument 200 may correspond with the instrument 100 (FIG. 1) to show the antenna 124 (FIG. 1) in greater detail, or with an alternative instrument. The housing 202 includes a pair of shafts 204, 206, a ring (or band) 208, and an end cap 210 disposed at an axial end opposite that of the axial end at which the tip 108 (FIG. 1) is disposed.

The shafts 204, 206 are conductive and otherwise configured to act as an antenna element and a ground plane of the antenna 202, respectively. The ring 208 is not conductive and disposed between the shafts 204, 206. The end cap 210 may or may not be conductive, and is disposed at an outward end of the shaft 204.

In this example of FIG. 2, the shafts 204, 206 are threadably engaged with the ring 208, and the end cap 210. Adjacent components of the housing 202 may be connected to, or engaged with, one another via alternative or additional techniques, including, for instance, interference- or press-fit fastenings. In some cases, one or more of the components are not fastened to adjacent components. For instance, the ring 208 may be or include a non-threaded sleeve that slidably engages either one or both of the shafts 204, 206, and/or another component of the housing 202 or the instrument 200.

The shafts 204, 206 are electrically connected to a circuit 212. In this example, the circuit 212 is disposed within the shaft 204. The electrical connections to the shafts 204, 206 are depicted schematically. In the example of FIG. 2, the shaft 204 is connected to the circuit 204 via a capacitive feed or coupling 214. The capacitive coupling 214 may include a conductor 216 connected to the shaft 204 at an antenna feed point 218. The conductor 216 and other aspects of the capacitive coupling 214 are depicted schematically in FIG. 2. The configuration and other characteristics of the conductor 216 may vary. For instance, various capacitive and non-capacitive coupling techniques may be used. A high dielectric antenna (HDA) ceramic feed is one option. A direct connection between the shaft 204, 206 and an element of the circuit 212, such as a capacitor on an integrated circuit (IC) chip (i.e., a chip capacitor), is also an option. For example, the instrument 200 may include a pogo pin or other conductive spring disposed between the shaft 204 and a printed circuit board (PCB) of the circuit 212, thereby electrically connecting the shaft 204 with a capacitor on the PCB or IC chip of the circuit 212. The capacitor is accordingly disposed in series along the antenna path.

The location of the antenna feed point 218 may be selected in accordance with the frequency band of the wireless communications. For instance, the antenna feed point 218 may be located at an axial position to configure the shaft 204 as an antenna element suitable for a particular resonant frequency and/or frequency band. In this example, the axial position of the antenna feed point 218 is offset from the midpoint of the shaft 204 and closer to an end of the shaft 204 proximate the ground plane provided by the shaft 206.

The feeding, or electrical connection, for the antenna element may differ from the example described above and shown in FIG. 2. For instance, the location of the antenna feed point 218 may vary. In some cases, the axial position of the antenna feed point 218 may be centered or otherwise offset from the midpoint of the shaft 204. The construction or other aspects of the capacitive coupling 214 may vary in other ways. For instance, the capacitive coupling 214 may not include the conductor 216, but instead be constructed to form or dispose one terminal of the capacitance at the shaft 204. As described above, non-capacitive feedings, or couplings, may also be used. For instance, the antenna feed point 218 may be directly connected to the circuit 212 via one or more conductive lines and/or other structures. Still other types of feeding may be used. For instance, a parallel plate coupling structure may be used, in which one plate of the structure is provided by one of the shafts 204, 206.

The shaft 206 may be electrically connected to the circuit 212 via a line 220. The line 220 may include one or more conductors. The electrical connection establishes the shaft 206 as a ground plane for the antenna element defined by the shaft 204.

The circuit 212 may be or include a transceiver circuit. The transceiver circuit may be configured for wireless communications involving one or more frequency bands supported by the housing-based antenna element. The circuit 212 may be connected to other components of the instrument 200, including, for instance, the end cap 210. In some cases, the end cap 210 is or includes a button assembly. Actuation of the button assembly may toggle between various operational states of the instrument 200.

The shaft 204 may have an axial length configured to establish a particular resonant frequency and frequency band for the antenna. In cases in which the end cap 210 is non-conductive (or at least does not include any conductive components electrically connected with the shaft 204), the axial length of the antenna element is established by the shaft 204. In other cases, the axial length of the antenna element may include the added length presented by the end cap 210 or a component thereof, such as an outer portion of a button assembly. Such added length may be useful in connection with longer wavelength signals (i.e., lower frequency bands). In such cases, the end cap 210 is conductive, or otherwise includes a conductive component electrically connected with the shaft 204.

In some cases, the housing 202 of the instrument 200 is configured to provide a wideband antenna for Bluetooth communications. In one Bluetooth example, the length of the antenna element via the shaft 204 is about 13 mm (e.g., 13.1 mm). The shaft 206 has a length of about 126 mm (e.g., 126.27 mm) for the ground plane. These lengths exhibit antenna bandwidth and efficiency results in excess of those specified for Bluetooth communications. For example, simulated return losses were less than −10 dB over a frequency range exceeding both ends of the band from 2.4 GHz to 2.5 GHz. Simulations of the radiated power also showed very good efficiency. The efficiency improvements arise, at least in part, from the use of the housing 202 (e.g., the shaft 204) as an outer, unobstructed antenna element.

In another example, the shaft 204 has a shorter length than the example described above. The shorter length is made possible due to the presence of conductive materials in the end cap 210. The end cap 210 is electrically connected to the shaft 204. In this example, the end cap 210 includes a conductive button. The conductive button may be configured to move axially when pressed by a user. The button may or may not be seated or engaged with an outer portion of a button assembly, as shown in FIG. 2. In one example in which the button is instead slidably engaged with the shaft 204, simulations show antenna bandwidth and efficiency results in excess of those specified for Bluetooth communications.

Wireless communications in other frequency bands may also be supported by the offset feed point and other antenna characteristics of the example of FIG. 2. For instance, the example of FIG. 2 is well suited for use as a wideband antenna for the frequency bands for long term evolution (LTE) and low energy LTE communications. In one example for such LTE frequency bands, the shaft 204 has a length of about 23 mm (e.g., 23.19 mm) and the shaft 206 has a length of about 116 mm (e.g., 116.27 mm). These lengths exhibit suitable return losses (e.g., less than −6 dB) for operation in a frequency range from about 1710 MHz to about 2700 MHz, which corresponds with, for instance, the LTE frequency bands 1, 2, 3, 4, 7, 15, and 16. Other bands may alternatively or additionally be supported, including, for instance, one or more of bands 30 and 33-41. Both metal or non-metal end caps may be used.

The performance of the above-described housing-based antennas is not hampered by the presence of a user hand. A user grasping the instrument 200 likely contacts the shaft 206 rather than the shaft 204. Impedance matching challenges for the antenna element may thus be avoided. Contact with the ground plane does not substantially change, if at all, the resonant frequency or bandwidth of the antenna. The performance of the antenna has been shown via simulations to not be adversely affected. For instance, the wide band nature of the above-described antennas allows the resonant frequency to shift as a result of user contact without adversely affecting antenna performance.

The above-described examples establish that housing-based antennas may be provided (1) in a manner compatible with design standards (e.g., length, etc.) for pens, styluses, and other instruments, and (2) with design flexibility. The lengths of the instruments may thus be in accordance with lengths expected by users of pens. For instance, both conductive (e.g., metallic) and non-conductive (e.g., plastic or rubber) end caps may be used.

The optional use of the end caps may be used to provide operational flexibility as well. For instance, in some cases, the instrument 200 includes one or more supplemental end caps 210. The supplemental end cap may be in addition to a primary end cap. The primary end cap 210 may be non-conductive (e.g., effectively non-conductive), and thus well-suited for shorter wavelength signals (higher frequency bands). The supplemental end cap(s) 210 is then conductive, and thus well-suited for longer wavelength signals (lower frequency bands). A user may substitute one of the end caps 210 for another to switch between the higher and lower frequency bands as desired.

Figure 3:
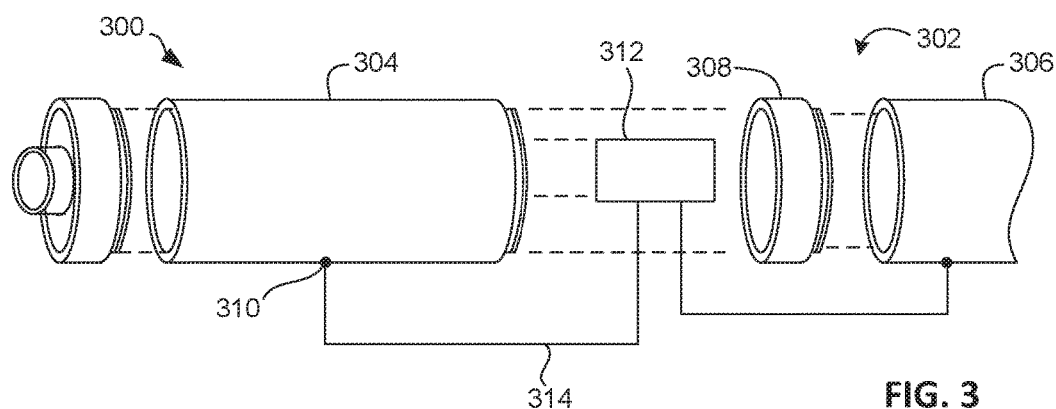
FIG. 3 is a partial, exploded, perspective, and schematic view of a pen instrument with antenna functionality provided via conductive housing for wireless communications in accordance with another example.

FIG. 3 depicts an instrument 300 with a housing-based antenna in accordance with another example. The instrument 300 includes a housing 302 that may be constructed and otherwise configured in a manner similar to the examples described above. For example, the housing 302 includes a conductive shaft 304 electrically connected and configured to operate as an antenna element, and a conductive shaft 306 electrically connected and configured to operate as a ground plane. The shafts 304, 306 may be spaced from one another by a gap established by a non-conductive ring (or band) 308 of the housing 302.

The instrument 300 may differ from the above-described examples in connection with an antenna feed point 310 at which a transceiver circuit 312 is electrically connected to the shaft 304. The location and other characteristics of the antenna feed point 310 may differ. In this case, the antenna feed point 310 is located at or near an axial midpoint of the shaft 304. The antenna feed point 310 may accordingly be characterized as disposed at an axially centered location. In contrast, the above-described antenna elements are fed at feed points offset from the axial midpoint (e.g., closer to an axial end of the shaft than to the axial midpoint).

Other characteristics of the antenna feed may also differ from the above-described examples. In this case, for instance, the antenna feed includes a line 314 that provides a direct connection with the transceiver circuit 312. The line 314 may be configured as a transmission line and/or a spring-loaded launch or other connection (e.g., a pogo pin). In some cases, direct connections (e.g., a solder connection) between the housing 302 and a coaxial cable may be used. Microstrip and stripline flexible printed circuits (FPCs) are other options.

The antenna element provided by the shaft 304 may also be longer than those described above. In some cases, the shaft 304 for the antenna element is longer than the shaft 306 for the ground plane. The added length may be useful for supporting other, lower frequency bands. The added length increases antenna volume to accommodate communication protocols, such as global navigation satellite system (GNSS) communications (e.g., 1570 MHz to 1610 MHz), that involve low frequency operation. In one GNSS example, the length of the shaft 304 is about 29 mm (e.g., 28.9 mm), and the length of the shaft 306 is about 110 mm (e.g., 110.24 mm). Performance in GNSS and other lower frequency bands is thus achieved without imposing design constraints on the instrument 300. The use of the housing 302 again avoids consuming internal space, thereby avoiding any limitations on other components of the instrument 300.

Figure 4:
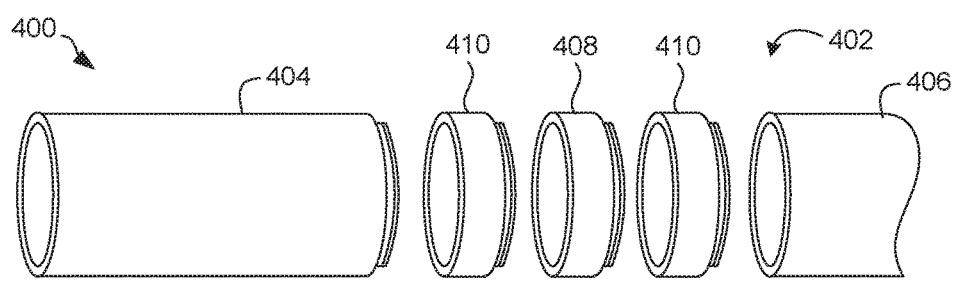
FIG. 4 is a partial, exploded, perspective, and schematic view of a pen instrument with housing-based antenna functionality integrated with another housing component in accordance with another example.

FIG. 4 depicts an instrument 400 in accordance with another example in which a housing 402 includes conductive shafts 404, 406 to provide an antenna element and ground plane, respectively. The instrument 400 and the housing 402 are similar in many respects to the examples described above, including, for instance, the manner in which the conductive shafts 404, 406 and other components of the housing 402 are engaged, as well as the manner in which the antenna is fed.

The instrument 400 differs from the above-described examples in connection with the gap between the conductive shafts 404, 406. In this example, the conductive shafts 404, 406 are spaced apart from one another by multiple components of the housing 402, rather than a single, non-conductive band or ring. The multiple components may include both conductive structures or elements in addition to the non-conductive element(s) used to electrically separate or insulate the conductive shafts 404, 406 from one another. In this case, the housing 402 includes a conductive ring (or band) 408 disposed between the conductive shafts 404, 406. The housing 402 also includes a respective non-conductive ring (or band) 410 on either side of the conductive ring 408 for electrical separation or isolation. For example, the conductive ring 408 may be or include a floating ring (e.g., a floating metal ring).

The arrangement of the conductive and non-conductive elements may be differ from the example shown in FIG. 4. For instance, the conductive and non-conductive rings 408, 410 may axially overlap one another. In some cases, the conductive ring 408 is concentrically disposed within a non-conductive ring 410.

The conductive ring 408 may be provided for aesthetic and/or functional reasons. In some cases, the conductive ring 408 may be or include an emissive element. For example, the conductive ring 408 may be configured to emit or display a color to indicate an operational state or parameter, such as an ON state or a current ink color. The state or parameter being indicated may vary considerably. For instance, a plurality of light-emitting diodes (LEDs) may be disposed between the conductive shafts 404, 406 to provide multiple status indicators. The ring(s) 408, 410 may be or include transparent rings or rings to allow the transmission of the light emitted from the LEDs. Other functions may be supported by the rings 408, 410, including, for instance, sensing functions. For example, one or both of the rings 408, 410 may be a component of an optical sensor, such as an infrared (IR) sensor, in which case one or both of the rings 408, 410 may be transparent at IR wavelengths. In those and other cases, the ring 408 may be conductive in the sense that the ring 408 includes one or more conductive elements (e.g., electrodes).

The performance of the antenna is not adversely affected by the presence of a conductor (or conductors) between the conductive shafts 404, 406. This aspect thus provides still further design flexibility for the instrument 400. A wide variety of structures may be disposed between the conductive shafts 404, 406. The nature of the conductive ring 408 may vary considerably from the LED indicator examples described above.

Figure 5:
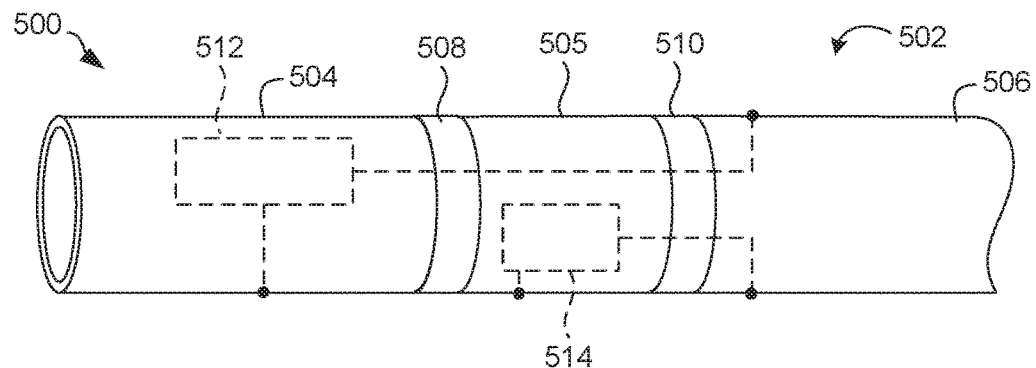
FIG. 5 is a partial, perspective, and schematic view of a pen instrument with multiple housing-based antenna elements for wireless communications in multiple frequency bands in accordance with another example.

FIG. 5 depicts an instrument 500 in accordance with an example in which a housing 502 includes multiple antenna elements. The housing 502 includes conductive shafts 504-506 to provide two antenna elements and ground plane, respectively. The conductive shafts 504 and 505 are separated by a non-conductive ring (or band) 508. The conductive shafts 505 and 506 are separated by a non-conductive ring (or band) 510. The instrument 500 may be similar in many other respects to the examples described above, including, for instance, the manner in which the conductive shafts 504-506 and other components of the housing 502 are engaged, as well as the manner in which the antenna elements are fed. The instrument 500 is also similar to the embodiment described in connection with FIG. 4, except that the conductive structure disposed between the two outer shafts 504, 506 provides antenna-related functionality rather than non-antenna-related functionality (e.g., a status indicator).

The instrument 500 includes multiple transceiver circuits 512, 514. In the example of FIG. 5, the transceiver circuits 512, 514 are disposed on respective PCBs. For instance, the circuit 512 may be disposed on a PCB enclosed within the conductive shaft 504, while the circuit 514 may be disposed on a PCB enclosed within the conductive shaft 505. In other cases, the transceiver circuits 512, 514 are disposed on a common PCB. Conductive lines are provided to electrically connect the circuits 512, 514 with the conductive shafts 504-506. The antenna elements provided by the shafts 504, 505 may be fed in various ways.

The conductive shafts 504, 505 may have different lengths. In the example of FIG. 5, the axial length of the shaft 504 is longer than the axial length of the shaft 505. The different lengths may be used to support wireless communications in different frequency bands. The shaft 504 may thus be configured for communications involving a lower frequency band (e.g., GPS communications), while the shaft 505 may thus be configured for communications involving a higher frequency band (e.g., Bluetooth communications).

During operation, the instrument 500 may switch between the frequency bands or communication protocols. In some cases, a user may toggle between the frequency bands. For instance, an end cap (see, e.g., FIG. 1) may include a push button assembly for actuation by the user for such toggling. Alternatively or additionally, control circuitry (e.g., one or both of the circuits 512, 514) of the instrument 500 is configured to switch between the bands in accordance with an operational state or condition. For example, communication protocols may be enabled and disabled based on whether the instrument 500 is within a predetermined proximity of a host device. Other operational states and conditions may be used, including, for instance, whether the control circuitry determines that the instrument 500 is currently being held by the user. The instrument 500 may have one or more sensors and/or control procedures directed to that determination.

Figure 6:
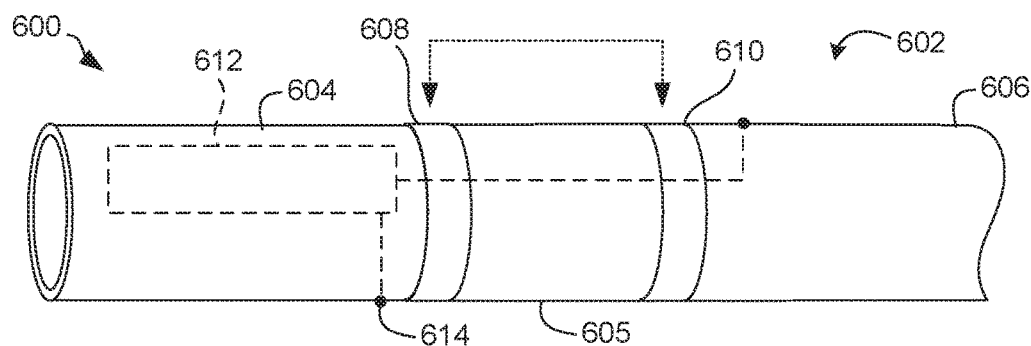
FIG. 6 is a partial, perspective, and schematic view of a pen instrument with configurable antenna functionality provided via multiple conductive housing components and swappable conductive and non-conductive bands in accordance with another example.

FIG. 6 depicts another example of an instrument 600 having multiple housing-based antenna elements. As in the example of FIG. 5, multiple antenna elements may be used to support multiple frequency bands, or communication protocols. In this case, housing structures are re-positioned (e.g., swapped) to switch between the frequency bands or otherwise modify the antenna functionality. The antenna functionality of the instrument 600 may thus be considered to be reconfigurable.

The instrument 600 may be similar in many respects to the example of FIG. 5. For instance, a housing 602 of the instrument 600 includes multiple conductive shafts 604-606. The shafts 604, 605 are configured to act as an antenna element. The shaft 606 is configured to act as a ground plane. Adjacent shafts of the shafts 604-606 are separated from one another by one of two rings (or bands) 608, 610.

The instrument 600 differs from the example of FIG. 5 in the nature of the two bands 608, 610. The ring 608 is conductive, while the other ring 610 is non-conductive. FIG. 6 shows a first housing operational configuration in which the ring 608 is disposed between the shafts 604, 605. Because the ring 608 is conductive, the shafts 604, 605 are electrically connected to one another. The shafts 604, 605 thus together form a composite antenna element having the combined length of the shafts 604, 605. The shafts 604, 605 have axial lengths such that the effective length of the composite antenna is appropriate for a desired frequency range or communication protocol. The composite antenna element is then separated from the ground plane provided by the shaft 606 by the non-conductive ring 610.

The positioning of the rings 608, 610 may be modified to change the antenna functionality. In this example, the rings 608, 610 are swapped to establish a second housing operational configuration. In the second configuration, the ring 610 is disposed between the shafts 604, 605, and the ring 608 is disposed between the shafts 605, 606. The non-conductive nature of the ring 610 thus electrically separates the shafts 604, 605. As a result, only the shaft 604 acts as an antenna element. The shaft 604 has a length that, when acting as antenna element alone, is suitable for supporting a different frequency band and communication protocol than those supported by the housing configuration shown in FIG. 6. With the conductive ring 608 between them, the shafts 605, 606 combine to act together as a composite ground plane.

The instrument 600 includes a transceiver circuit 612 disposed within the space defined by the shafts 604-606 of the housing 602. In this example, the circuit 612 is electrically connected to the shaft 604 at a common antenna feed point 614. The antenna elements for both operational configurations are fed via the antenna feed point 614. In other cases, multiple feed points may be used.

In the example of FIG. 6, the common antenna feed point 614 is located near an inward end of the shaft 604. The positioning and shaft lengths may be selected such that the feed point is centered in the first operational configuration, and offset in the second operational configuration. In the first operational configuration, the feed point 614 is near the axial midpoint of the composite antenna element defined by the shafts 604, 605 and the conductive ring 608. To that end, the shaft 605 and the conductive ring 608 may combine to present roughly the same axial length of the shaft 604. In the second operational configuration, the common antenna feed point 614 is offset from the axial midpoint of the shaft 604. In this manner, the reconfigurable housing provides different feed point arrangements as well as different antenna element lengths for the antenna elements of the two operational configurations.

The example of FIG. 6 shows that a single instrument can support multiple wireless communication protocols through multiple rings (conductive and nonconductive). In one example, the composite antenna element of the first operational configuration is directed to supporting GPS communications, while the second operational configuration is directed to supporting Bluetooth communications. This reconfigurable housing-based approach to multiple frequency support applies to other frequency bands, such as LTE bands.

Figure 7:
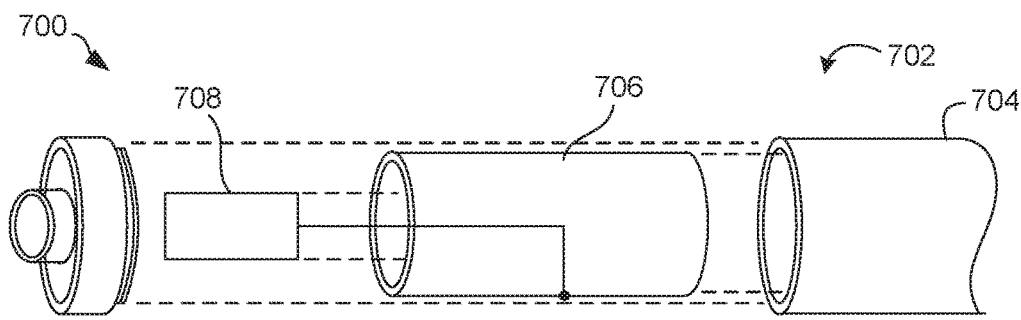
FIG. 7 is a partial, exploded, perspective, and schematic view of a pen instrument having a conductive housing sleeve for antenna functionality in accordance with another example.

FIG. 7 depicts an instrument 700 in accordance with an example in which a housing 702 includes inner and outer components to provide antenna functionality. In this example, the housing 702 includes an outer casing 704 and an inner sleeve 706 disposed within the outer casing 704. The inner sleeve 706 is configured as an antenna element of the instrument 700. To that end, the inner sleeve 706 is composed of a conductive material, such as metal. The outer casing 704 is then composed of a non-conductive material.

The components of the housing 702 define an inner volume or space in which components of the instrument 700 are enclosed or otherwise disposed, as in the above-described examples. For example, a circuit 708 is disposed within both the outer casing 704 and the inner sleeve 706. The circuit 708 may be electrically connected to the inner sleeve 706 to establish a feed point as described above.

The construction and other characteristics of the inner sleeve 706 may be vary. For example, the inner sleeve 706 may or may not be affixed to the outer casing 704. In some cases, the inner sleeve 706 is or includes a skin or other film disposed on an inner surface of the outer casing 704. In other cases, the inner sleeve 706 is or includes a tube or shaft (e.g., a cylindrical metal plate) nested within the outer casing 704.

The ground plane of the instrument 700 may be provided via one or more shafts as described in connection with the examples of FIGS. 1-6. Alternatively, the ground plane is provided via a further inner sleeve of the housing 702.

The use of inner sleeve(s) allows the instrument to have user handles and other external surfaces composed of non-metallic materials. For example, a top and/or bottom segment of the instrument housing may be composed of a plastic or rubberized material, if desired. A variety of instrument designs may thus be accommodated, while still using the housing for antenna functionality.

Described above are pens and other instruments with metallic or other conductive body or housing configured for antenna functionality. Such use of the housing or body allows the pen or instrument to remain compact and compatible with existing designs, including designs in which a smooth and seamless body is desired. The housing- or body-based antenna components may be configured to support several communication protocols such as LTE, ISM, GNSS, and IEEE 802.11 (W-Fi).

The above-described instruments provide more internal space for other instrument components and subsystems within the instrument or pen housing. The antenna element and/or ground plane is no longer consuming internal space. This space savings is especially useful in connection with lower frequency bands that call for larger antennas. Lower operational frequencies also may warrant higher keep-out for the antenna (or larger volumes around the antenna element free of other conductive objects).

These and other advantages are achieved while allowing the instruments to have metallic outer surfaces. The lack of propagation of electromagnetic waves through such metallic surfaces is no longer a constraint on instrument design. The disclosed instruments have the option of incorporating the appearance and feel of such metallic surfaces.

In one aspect, an instrument includes a housing that defines a handle for a user of the instrument, and a circuit disposed within the housing, the circuit being configured to implement wireless communications. The housing includes a conductive shaft. The circuit is electrically connected to the conductive shaft such that the conductive shaft is configured as an antenna element for the wireless communications or as a ground plane for the antenna element.

In another aspect, an instrument includes a housing that defines a handle for a user of the instrument, a tip disposed at an axial end of the housing, the housing extending from the tip, and a circuit disposed within the housing, the circuit being configured to implement wireless communications. The housing includes a conductive shaft that establishes an external surface of the instrument. The housing and the conductive shaft are elongate in an axial direction extending from the tip. The circuit is electrically connected to the conductive shaft such that the conductive shaft is configured as an antenna element for the wireless communications or as a ground plane for the antenna element.

In yet another aspect, an instrument includes a housing that defines a handle for a user of the instrument, a tip disposed at an axial end of the housing, the housing extending from the tip, and a circuit disposed within the housing, the circuit being configured to implement wireless communications. The housing comprises a conductive shaft that establishes an external surface of the instrument. The circuit is electrically connected to the conductive shaft such that the conductive shaft is configured as an antenna element for the wireless communications.

In connection with any one of the aforementioned aspects, the systems, devices, and/or methods described herein may alternatively or additionally include any combination of one or more of the following aspects or features. The conductive shaft is positioned as an outer surface of the instrument. The conductive shaft is a first conductive shaft of the housing. The housing includes a second conductive shaft that defines the user handle. The first conductive shaft is configured as the antenna element. The second conductive shaft is configured as the ground plane. The instrument further includes a tip at an axial end of the housing. The second conductive shaft is positioned between the first conductive shaft and the tip. The housing includes a third conductive shaft configured as a further antenna element. The first and second conductive shafts are spaced apart from one another by a dielectric material. The housing includes a conductive structure disposed between the first and second conductive shafts. The instrument further includes a conductive band and a non-conductive band. The conductive shaft is a first conductive shaft of a plurality of conductive shafts of the housing. A second conductive shaft of the plurality of conductive shafts is spaced from the first conductive shaft by the conductive band in a first operational configuration or the non-conductive band in a second operational configuration. The conductive band and the first and second conductive shafts are configured to act as the antenna element for a first frequency band in the first operational configuration. The first conductive shaft is configured to act as the antenna element for a second frequency band in the second operational configuration. The plurality of conductive shafts includes a third conductive shaft that defines the user handle. The third conductive shaft is spaced from the second conductive shaft by the non-conductive band in the first operational configuration and by the conductive band in the second operational configuration. The circuit is electrically connected to the antenna elements in the first and second operational configurations at a common feed point. The conductive shaft is a first conductive shaft of the housing. The housing includes a second conductive shaft that further establishes the external surface of the instrument. The second conductive shaft is configured as a second antenna element. The first and second conductive shafts have different lengths such that the first and second antenna elements support wireless communications in different frequency bands. The conductive shaft defines the user handle. The circuit and the conductive shaft are capacitively connected at a feed point along the conductive shaft. The instrument further includes a conductive cap disposed at an axial end of the housing and electrically connected with the conductive shaft. The wireless communications include long-term evolution (LTE) communications.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. An instrument comprising:
   a housing that defines a handle for a user of the instrument; and
   a circuit disposed within the housing, the circuit being configured to implement wireless communications;
   wherein:
   the housing comprises a first conductive shaft and a second conductive shaft;
   the circuit is electrically connected to the first conductive shaft;
   the first conductive shaft is configured as an antenna element for the wireless communications; and
   the second conductive shaft defines the handle and is configured as a ground plane for the antenna element.

2. The instrument of claim 1, wherein the first conductive shaft is positioned as an outer surface of the instrument.

3. The instrument of claim 1, further comprising a tip at an axial end of the housing, wherein the second conductive shaft is positioned between the first conductive shaft and the tip.

4. The instrument of claim 1, wherein the housing comprises a third conductive shaft configured as a further antenna element.

5. The instrument of claim 1, wherein:
   the first and second conductive shafts are spaced apart from one another by a dielectric material; and
   the housing comprises a conductive structure disposed between the first and second conductive shafts.

6. The instrument of claim 1, further comprising a conductive band and a non-conductive band, wherein:
   the first conductive shaft is one of a plurality of conductive shafts of the housing;
   the second conductive shaft of the plurality of conductive shafts is spaced from the first conductive shaft by the conductive band in a first operational configuration or the non-conductive band in a second operational configuration;
   the conductive band and the first and second conductive shafts are configured to act as the antenna element for a first frequency band in the first operational configuration; and
   the first conductive shaft is configured to act as the antenna element for a second frequency band in the second operational configuration.

7. The instrument of claim 6, wherein:
   the plurality of conductive shafts comprises a third conductive shaft that defines the user handle; and
   the third conductive shaft is spaced from the second conductive shaft by the non-conductive band in the first operational configuration and by the conductive band in the second operational configuration.

8. The instrument of claim 6, wherein the circuit is electrically connected to the antenna elements in the first and second operational configurations at a common feed point.

9. The instrument of claim 1, wherein the circuit and the first conductive shaft are capacitively connected at a feed point along the first conductive shaft.

10. The instrument of claim 1, further comprising a conductive cap disposed at an axial end of the housing and electrically connected with the first conductive shaft.

11. The instrument of claim 1, wherein the wireless communications comprise long-term evolution (LTE) communications.

12. An instrument comprising:
    a housing that defines a handle for a user of the instrument;
    a tip disposed at an axial end of the housing, the housing extending from the tip; and
    a circuit disposed within the housing, the circuit being configured to implement wireless communications;
    wherein:
    the housing comprises a first conductive shaft that establishes an external surface of the instrument and a second conductive shaft that defines the user handle;
    the housing and the first conductive shaft are elongate in an axial direction extending from the tip; and
    the circuit is electrically connected to the first conductive shaft such that the first conductive shaft is configured as an antenna element for the wireless communications and the second conductive shaft is configured as a ground plane for the antenna element.

13. The instrument of claim 12, further comprising a conductive band and a non-conductive band, wherein:
    the first conductive shaft is one of a plurality of conductive shafts of the housing;
    the second conductive shaft of the plurality of conductive shafts is spaced from the first conductive shaft by the conductive band in a first operational configuration or the non-conductive band in a second operational configuration;
    the conductive band and the first and second conductive shafts are configured to act as the antenna element for a first frequency band in the first operational configuration; and
    the first conductive shaft is configured to act as the antenna element for a second frequency band in the second operational configuration.

14. The instrument of claim 13, wherein:
    the plurality of conductive shafts comprises a third conductive shaft that defines the user handle; and
    the third conductive shaft is spaced from the second conductive shaft by the non-conductive band in the first operational configuration or the conductive band in the second operational configuration, respectively.

15. The instrument of claim 13, wherein the circuit is electrically connected to the antenna elements in the first and second operational configurations at a common feed point.

16. An instrument comprising:
    a housing that defines a handle for a user of the instrument;
    a tip disposed at an axial end of the housing, the housing extending from the tip; and
    a circuit disposed within the housing, the circuit being configured to implement wireless communications;
    wherein:
    the housing comprises a first conductive shaft that establishes an external surface of the instrument;
    the housing comprises a second conductive shaft that further establishes the external surface of the instrument;
    the circuit is electrically connected to the first conductive shaft such that the first conductive shaft is configured as a first antenna element for the wireless communications;
    the second conductive shaft is configured as a second antenna element; and
    the first and second conductive shafts have different lengths such that the first and second antenna elements support wireless communications in different frequency bands.

17. The instrument of claim 16, further comprising a conductive band and a non-conductive band, wherein:
- the first conductive shaft is one of a plurality of conductive shafts of the housing;
- the second conductive shaft of the plurality of conductive shafts is spaced from the first conductive shaft by the conductive band in a first operational configuration or the non-conductive band in a second operational configuration;
- the conductive band and the first and second conductive shafts are configured to act as the first and second antenna elements for a first frequency band in the first operational configuration; and
- the first conductive shaft is configured to act as the first antenna element for a second frequency band in the second operational configuration.

\* \* \* \* \*